United States Patent [19]

Springer et al.

[11] Patent Number: 5,582,498

[45] Date of Patent: Dec. 10, 1996

[54] WHEEL ACTIVATED VEHICLE RESTRAINT

[75] Inventors: Scott L. Springer, Milwaukee; Norbert Hahn, Franklin, both of Wis.

[73] Assignee: Rite-Hite Corporation, Milwaukee, Wis.

[21] Appl. No.: 590,400

[22] Filed: Jan. 25, 1996

Related U.S. Application Data

[63] Continuation of Ser. No. 327,308, Oct. 21, 1994, abandoned.

[51] Int. Cl.$^6$ .................................................. B65G 69/00
[52] U.S. Cl. ........................... 414/401; 414/584; 188/32
[58] Field of Search ......................... 414/396, 401–402, 414/584, 786; 410/30, 49; 188/32

[56] References Cited

U.S. PATENT DOCUMENTS

| Re. 32,968 | 6/1989 | Hahn | 414/401 |
|---|---|---|---|
| Re. 33,154 | 1/1990 | Hahn et al. | 414/401 |
| Re. 33,242 | 6/1990 | Hipp et al. | 414/401 |
| 2,413,744 | 1/1947 | Carter | 280/179 |
| 2,773,564 | 12/1956 | Garard, Sr. | 188/32 |
| 3,110,466 | 11/1963 | O'Sullivan | 248/119 |
| 3,221,907 | 12/1965 | O'Sullivan | 188/32 X |
| 3,305,049 | 2/1967 | Willey | 188/32 |
| 3,447,639 | 6/1969 | Parr | 188/32 |
| 3,542,157 | 11/1970 | Noah | 188/32 |
| 3,666,118 | 5/1972 | Raynes et al. | 414/401 |
| 3,667,160 | 6/1972 | Salloum | 49/35 |
| 4,013,145 | 3/1977 | Mumm | 188/32 |
| 4,122,629 | 10/1978 | Rennick | 188/32 X |
| 4,146,888 | 3/1979 | Grunewald et al. | 340/679 |
| 4,191,503 | 3/1980 | Neff et al. | 414/401 |

(List continued on next page.)

FOREIGN PATENT DOCUMENTS

| 1308222 | 8/1988 | Canada . | |
|---|---|---|---|
| 0384850A1 | 8/1990 | European Pat. Off. . | |
| 0537075A1 | 4/1993 | European Pat. Off. . | |
| 0580415A1 | 1/1994 | European Pat. Off. . | |
| 05357075B1 | 4/1995 | European Pat. Off. . | |
| 2394423 | 2/1979 | France | 188/32 |
| 2652340 | 3/1991 | France | 414/401 |
| 2672578 | 8/1992 | France . | |
| 2682343 | 4/1993 | France . | |
| 3830891A1 | 3/1990 | Germany . | |
| 60-36230 | 3/1985 | Japan . | |
| 0157253 | 7/1978 | Netherlands | 410/30 |
| 1036593 | 8/1983 | U.S.S.R. | 188/32 |
| WO95/18029 | 7/1995 | WIPO . | |

OTHER PUBLICATIONS 4 page Dyna Seal brochure of Wheelblocker.
4 pages from German publication *Barrometer* dated Nov. 1994.
5 pages of German Info Bulletin—"Stertil"—Combilok—Vrachtwagenblokkering.
2-page brochure, "Kelley Auto Chock Truck Restraint".

(List continued on next page.)

*Primary Examiner*—James W. Keenan
*Attorney, Agent, or Firm*—Leydig, Voit & Mayer, Ltd.

[57] ABSTRACT

A wheel-actuated vehicle restraint device is provided for restraining at least one wheel of a vehicle during loading and unloading thereof. The vehicle restraint comprises a lock assembly comprising an actuation assembly for initially engaging the wheel of the incoming vehicle and a lock assembly for chocking the wheel in response to engagement between the wheel and the actuation assembly. The lock assembly is operatively connected to the actuation assembly at a connection point such that the connection point is selectively positionable in response to the dimensions and location of the wheel for insuring that the lock assembly engages a bottom portion of the wheel and moves along the peripheral surface of the wheel to a chock position. In one embodiment, the actuation assembly comprises a trigger assembly disposed to engage the wheel and a trolley assembly operatively connecting the lock assembly and trigger assembly. The trolley assembly comprises a variable length biasing link such that the length of the link varies in response to the wheel dimensions and location, thereby positioning the lock assembly to engage the bottom portion of the wheel before moving to the chock position.

21 Claims, 7 Drawing Sheets

U.S. PATENT DOCUMENTS

| | | | |
|---|---|---|---|
| 4,207,019 | 6/1980 | Cone | 414/373 |
| 4,208,161 | 6/1980 | Hipp et al. | 414/401 |
| 4,264,259 | 4/1981 | Hipp | 414/401 |
| 4,267,748 | 5/1981 | Grunewald et al. | 74/529 |
| 4,282,621 | 8/1981 | Anthony et al. | 14/71.1 |
| 4,373,847 | 2/1983 | Hipp et al. | 414/401 |
| 4,379,354 | 4/1983 | Hahn et al. | 14/71.3 |
| 4,443,150 | 4/1984 | Hahn et al. | 414/401 |
| 4,472,099 | 9/1984 | Hahn et al. | 414/401 |
| 4,560,315 | 12/1985 | Hahn | 414/401 |
| 4,572,080 | 2/1986 | Williams et al. | 104/252 |
| 4,605,353 | 8/1986 | Hahn et al. | 414/401 |
| 4,634,334 | 1/1987 | Hahn et al. | 414/401 |
| 4,653,967 | 3/1987 | Isaksson et al. | 410/30 X |
| 4,674,941 | 6/1987 | Hageman | 414/401 |
| 4,676,344 | 6/1987 | Locicero | 188/32 |
| 4,695,216 | 9/1987 | Erlandsson | 414/401 |
| 4,728,242 | 3/1988 | Erlandsson | 414/401 |
| 4,759,678 | 7/1988 | Hageman | 414/401 |
| 4,765,792 | 8/1988 | Cherry et al. | 414/401 |
| 4,767,254 | 8/1988 | Kovach et al. | 414/401 |
| 4,784,567 | 11/1988 | Hageman et al. | 414/401 |
| 4,815,918 | 3/1989 | Bennett et al. | 414/401 |
| 4,861,217 | 8/1989 | Erlandsson | 414/401 |
| 4,865,508 | 9/1989 | Carlson | 414/401 |
| 4,915,568 | 4/1990 | West | 414/401 |
| 4,938,647 | 7/1990 | Erlandsson | 414/401 |
| 4,963,068 | 10/1990 | Gelder | 414/401 |
| 4,969,792 | 11/1990 | Ellis et al. | 414/401 |
| 4,973,213 | 11/1990 | Erlandsson | 414/401 |
| 5,096,021 | 3/1992 | Tart | 188/32 |
| 5,249,905 | 10/1993 | Warner et al. | 414/401 |
| 5,302,063 | 4/1994 | Winsor | 410/49 X |
| 5,375,965 | 12/1994 | Springer et al. | 414/401 X |

OTHER PUBLICATIONS

4–pages of brochure re "Combar" product (in German).
2 pages of blueprints (reduced in size) of Pentalift.
Brochure re Combar product (German) 4 pages.
5 photographs of Combar product.
4 page Dyna Seal brochure with translation.

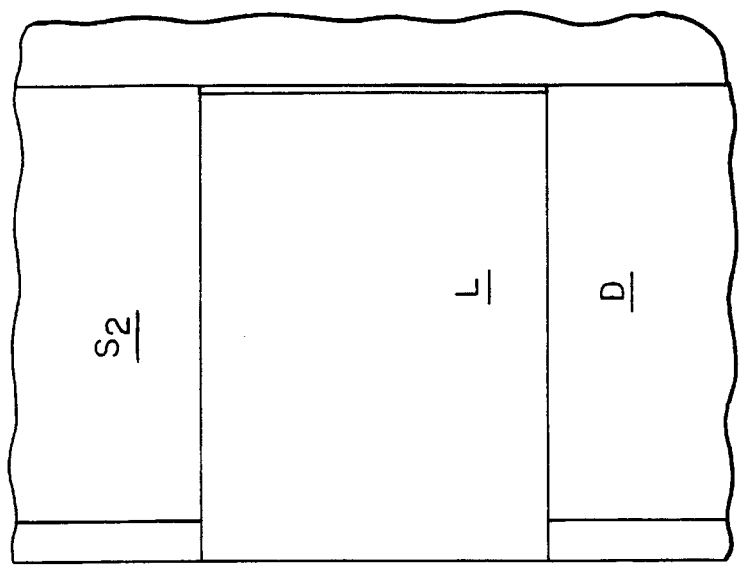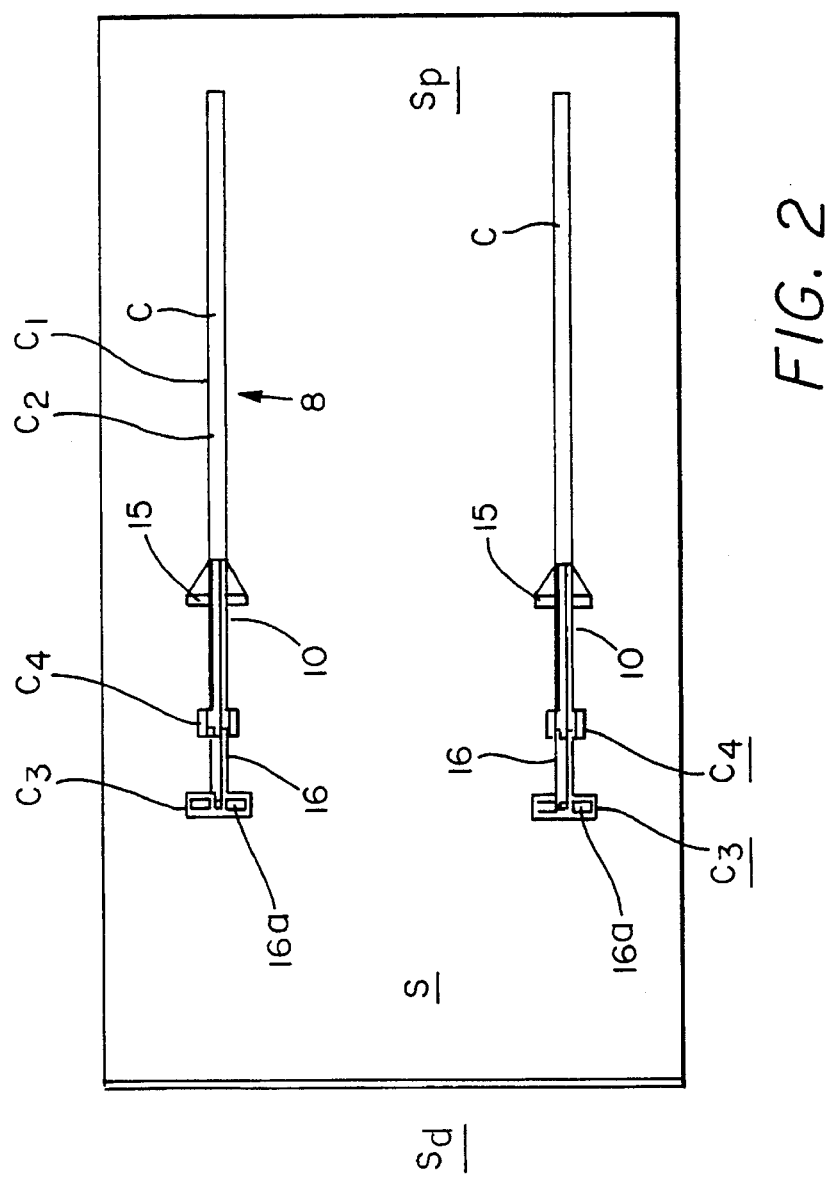
FIG. 2

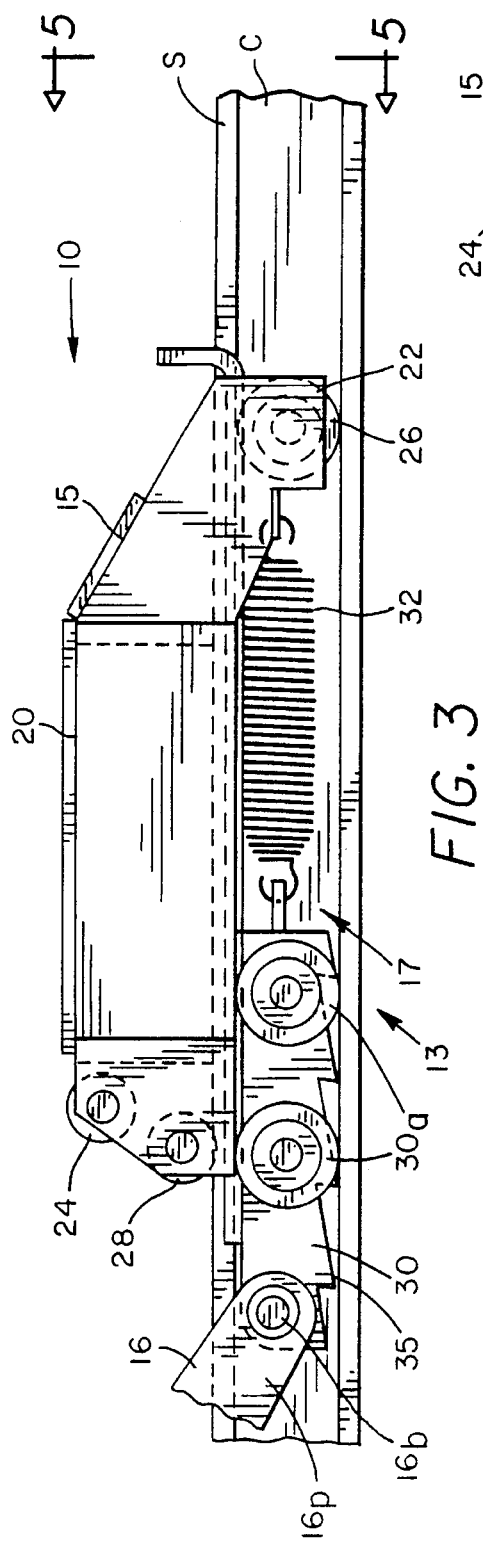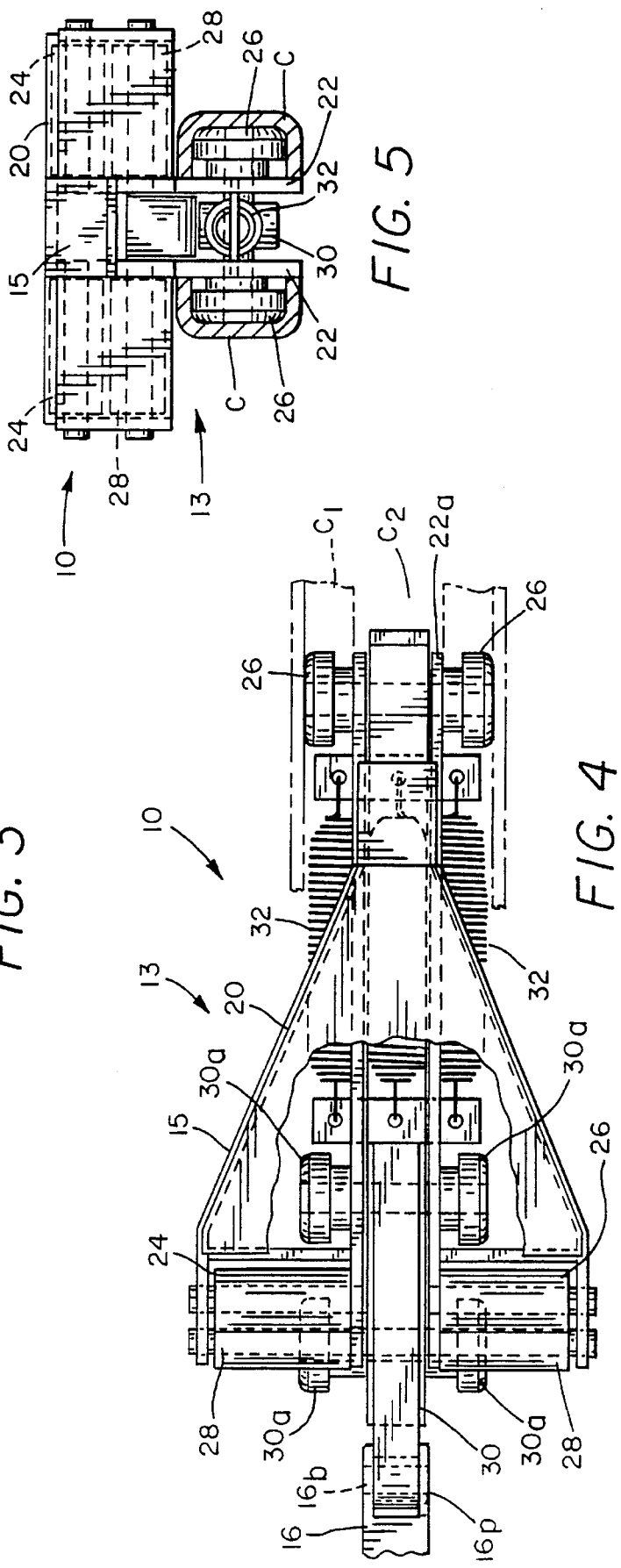

WHEEL ACTIVATED VEHICLE RESTRAINT

This is a continuation of application Ser. No. 08/327,308 filed on Oct. 21, 1994, now abandoned.

FIELD OF INVENTION

This invention relates to a wheel-actuated device for restraining a vehicle from movement from a parked position and, more specifically, during the loading and unloading operation typically at a loading dock.

BACKGROUND OF THE INVENTION

In the loading and unloading of vehicles parked adjacent a loading dock, heavy equipment such as forklifts and the like are used to facilitate and expedite the loading and unloading operation. It is imperative that the vehicle remain in a fixed abutting position relative to the loading dock to prevent serious accidents to both personnel and equipment. Without proper securement, there is a real potential hazard that the vehicle may inadvertently move away from the loading dock during the loading or unloading operation so that personnel may be injured or equipment may be damaged.

Previous attempts to employ roadway mounted restraints to prevent the vehicle from prematurely moving away from the loading dock have been largely unsuccessful or have had several shortcomings. Attempts to place wheel blocks underneath and wedged in front of the vehicle's wheels have been unsuccessful because (1) the blocks are easily lost or damaged, (2) the blocks may not operate effectively due to a slippery road surface from oil, rain, ice or snow, (3) the blocks are awkward to handle and sometimes difficult to remove from the wedged position; and (4) the blocks require the dock personnel manipulating the device to be located on the roadway adjacent the dock; thus, care must be exercised by the personnel to avoid being injured by the vehicle.

Other attempts to utilize locking mechanisms to obtain proper securement of the vehicle to the loading dock including U.S. patent application Ser. No. 08/206,842, filed Mar. 7, 1994, and incorporated herein by reference, have had one or more of the following problems: (1) they are incapable of being utilized with a wide variety of vehicle designs because, for example, they may interfere with the vehicle undercarriage, tailgate lifts, mud flaps, or the adjacent tires; (2) they rely on the presence and structural integrity of the vehicle ICC bumper, which may be missing, damaged, or of insufficient strength to restrict vehicle motion; (3) they are awkward, difficult and time consuming to engage and disengage from the vehicle parked at the dock; and (4) the location of the mechanism at the loading dock interferes with the normal operation of the loading equipment during the loading and unloading operation.

SUMMARY OF THE INVENTION

Thus, it is an object of the invention to provide a truck restraining device which is not beset with the shortcomings associated with prior devices.

It is an object of the invention to provide a device which is capable of accommodating vehicles of widely varying configurations and sizes.

It is another object of the invention to provide a device which can restrain a vehicle without an ICC bumper.

A further object of the invention is to provide a device which is compact and has a low profile for accommodating vehicles having low undercarriages or lower tailgates.

It is an object of the present invention to provide a vehicle restraint having a variable and extensible range of motion permitting the vehicle restraint to initially engage the lagging edge of the wheel at a relatively low position on the wheel surface and travel along the peripheral surface of the wheel between the stored and operative positions while minimizing the potential for any other part of the vehicle from restricting the vehicle restraint's motion.

It is another object of the present invention to provide a vehicle restraint having a low profile relative to the driveway so that the vehicle restraint does not interfere with any other portion of the vehicle, i.e., ICC bars, tailgates, fenders or mud flaps, insuring that the vehicle restraint initially contacts the tire as intended and allowing reliable operation of the vehicle restraint over a wider range of vehicle sizes and configurations.

It is a related object of the invention to provide a low profile vehicle restraint which permits the vehicle T to drive over the vehicle restraint without damage to the vehicle restraint or the vehicle in the event that the dockward motion of the vehicle restraint is restricted by debris and the like.

A similar object of the invention is to provide a device which may be readily utilized in conjunction with other loading dock equipment such as dock levelers and the like without interfering with the operation of the loading dock.

A further object of the invention is to provide a device which is not hazardous to either personnel or the vehicle.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 2 is a top plan view of the vehicle restraint shown in FIG. 1;

FIG. 3 is a fragmentary side view of another embodiment of the lock assembly disposed in a channel;

FIG. 4 is a fragmentary top view of the lock assembly shown in FIG. 3;

FIG. 5 is a fragmentary end view of the lock assembly shown in FIG. 3 and mounted in a channel;

DETAILED DESCRIPTION OF THE PREFERRED EMBODIMENT

Figure 1A:
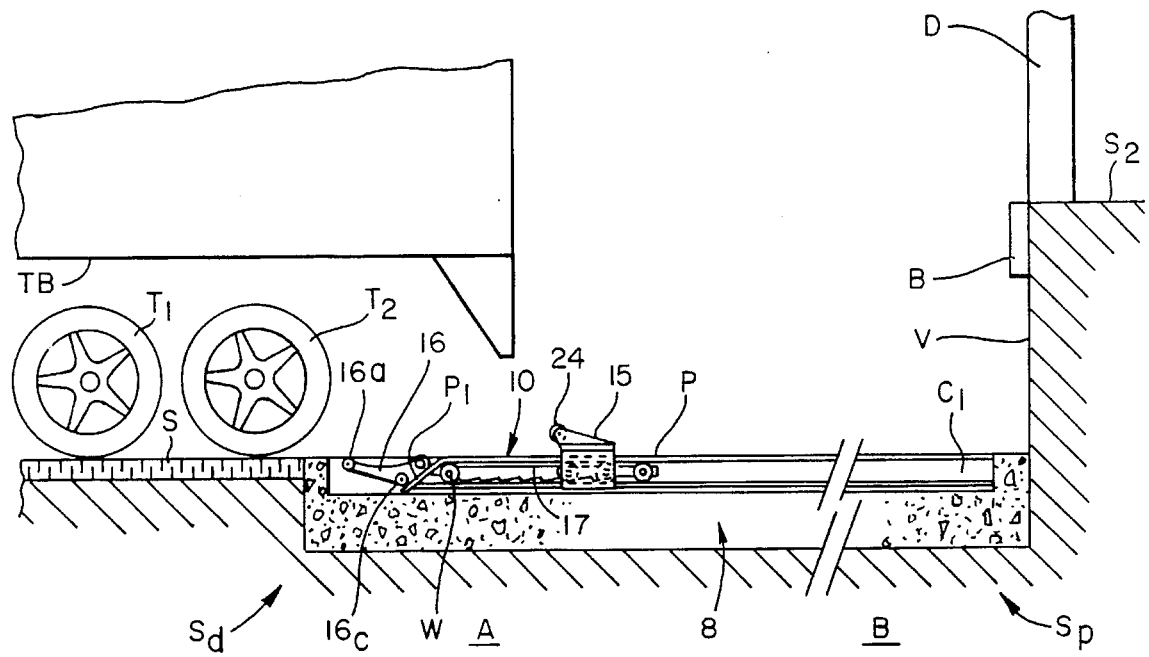
FIGS. 1 (A)–(B) are side schematic views of one embodiment of a low profile tire activated vehicle restraint in accordance with the present invention wherein the lock assembly is being moved between a stored and retracted position at the distal end of the driveway in FIG. 1A and a locked position at the proximal end of the driveway.
Figure 1B:
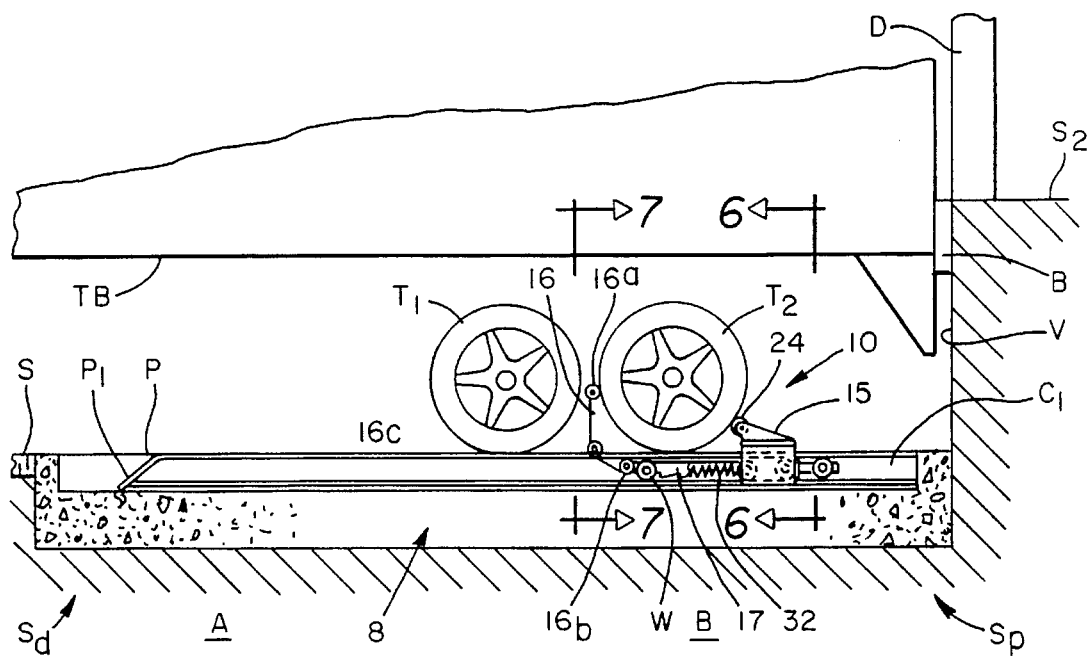

Referring to the figures, FIGS. 1(A)–(B) schematically illustrate a low profile tire-activated vehicle restraint 8 in accordance with the present invention. The vehicle restraint 8 is installed in a conventional loading dock roadway or treadway S adjacent a conventional loading dock D which is normally provided at warehouses, truck terminals, manufacturing plants and the like where products are received and/or dispatched by a truck or vehicle T. The illustrated vehicle T has a front tire (not shown), a plurality of intermediate or floating tires T1 and a rear tire T2. When the vehicle T is backed towards the loading dock D for the loading operations, the rear tire T2 "leads" the truck T and is thus sometimes referred to as the "leading" tire T2.

The conventional loading dock D located at the proximal end of the driveway Sp is normally provided with a horizontal surface or deck S2 over which loading equipment such as forklift trucks and the like and dock personnel maneuver during the loading and unloading operation. The dock D is typically provided with a leveler assembly L which is adapted to compensate for height differentials between the deck S2 and the upper supporting surface of the truck bed TB. In addition, dock D normally includes a vertical wall V or surface against which the rear end of the vehicle T abuts during the loading and unloading operations. The surface V is provided with suitable bumpers B or fenders which are engaged by the rear of the vehicle T thereby preventing damage or defacement of either the dock D or the vehicle T when the vehicle T is backing into position. The vehicle restraining device 8 is intended to effectively and readily secure the vehicle T in proper position relative to the dock D and prevent the vehicle T from inadvertently moving away from the dock D during the loading and unloading operation.

The vehicle restraint 8 comprises a lock assembly 10 movable between an initial, retracted, or stored position at the distal end Sd of the driveway S as shown in FIG. 1a and a plurality of operating positions between the distal and proximal ends of the driveway S in response to movement of the vehicle T. Any of the operating positions can become a fully locked or chock position at the proximal end Sp of the driveway S (position B) by engagement between the latch mechanism 50 and the lock assembly 10. As the vehicle T backs into the loading dock D, the leading tire T2 engages and pushes the lock assembly 10 from the distal end Sd towards the proximal end Sp of the driveway S where the lock assembly 10 is activated from one of the operating positions to its fully locked and chock position. In the locked position, the vehicle restraint 10 fully engages and captures the leading tire T2 so that the vehicle T is restrained from inadvertent movement from the loading dock D in accordance with certain objects of the invention.

FIG. 2 illustrates a top view of the vehicle restraint system 8 for restraining a vehicle T comprising two lock assemblies 10 installed in the driveway S and adjacent the loading dock D, each assembly 10 generally disposed in the center of the driveway S for engaging the corresponding left and right wheel T2 of a vehicle T backing into the loading dock D. It will be appreciated that other embodiments of the system 8 may have only one lock assembly 10 adapted to capture only one of the vehicle wheels. The restraint 8 comprises a track means for permitting the lock assembly 10 to move between the distal end Sd (at the left in FIGS. 1–2) to a proximal end Sp of the driveway S (at the right in FIGS. 1–2). In the illustrated system 8, the track means a channel C which extends along the longitudinal axis of the driveway S for receiving the lock assembly 10. The channel C is disposed along the longitudinal axis of the driveway S so that it is relatively perpendicular to the loading dock D and will be substantially parallel to the longitudinal axis of a vehicle T parked in the driveway S. In the embodiment best illustrated in FIGS. 1 and 3, the channel C is disposed subjacent the driveway surface S. The edges C of the channel C define a slot C2 at the driveway surface S permitting access therein as shown in FIGS. 2 and 4. It will be appreciated that in other embodiments the channel C may be disposed above the driveway surface S. Similarly, track means other than a channel will be known to those skilled in the art for positioning the lock assembly 10 along the driveway in response to the vehicle's movement.

The lock assembly 10 comprises a locking arm 16 (sometimes called a lagging arm or chock mechanism) operatively connected to an actuation assembly 13 for positioning the locking arm 16 between the initial, retracted position and a plurality of operating positions in response to the vehicle dockward motion. The illustrated embodiment of the lock assembly 10 has a locking arm 16 and a connection point 16b operatively connected to the actuation assembly 13 such that the connection point 16b is selectively positionable in response to the dimensions and movement of the wheel T2 for insuring that lock assembly 10 engages a bottom portion of the wheel and moves along the peripheral surface of the wheel to the chock position.

In the illustrated embodiments, the actuation assembly 13 comprises a trolley assembly 17 (sometimes called a dolly or connector) operatively connecting the locking arm 16 and a trigger assembly 15 (sometimes called a leading arm or engaging mechanism). The trigger assembly 15 is adapted to actuate the trolley assembly 17 and the locking arm 16 in response to engagement with the leading tire T2. The actuation assembly is adapted to have a variable length with respect to locking arm connection point 16b which permits the position of the connection point 16b of the locking arm 16 to be varied with respect to the tire position, thereby accommodating different tire sizes and permitting the locking arm 16 to closely engage the peripheral surface of the tire T2 in order to minimize interference with the vehicle undercarriage and any adjacent tires T1. The locking arm 16 is adapted to cooperate with the trigger assembly 15 to capture the tire T2 therebetween and to selectively prevent movement of the tire T2 and the vehicle T away from the dock and not prevent motion of the vehicle T toward the dock under any circumstances.

In the embodiment of the lock assembly shown in FIGS. 3–4, the trigger assembly 15 comprises a top portion 20 which is disposed above the driveway surface S for engaging the leading tire T2 and a bottom portion 22 depending from the top portion 20 for slidably engaging the channel C disposed below the driveway surface S. The top portion 20 has at least one roller 24 for rotatably engaging the leading tire T2 when the vehicle T is driven into the driveway S. The top portion 20 has a low provide relative to the driveway surface S to insure that the wheel T2 engages the trigger assembly 15 and to minimize or eliminate any interference from the vehicle T undercarriage, mud flaps, tailgates and the like.

In order to facilitate movement of the trigger assembly 15 between the distal and proximate ends of the channel C (and the driveway S), the bottom portion 22 has at least one wheel 26 disposed within the channel C. The depending walls 22a of the bottom portion 20 act to maintain alignment between the lock assembly 10 and the channel C. The top portion 20 has at least one roller 28 straddling the slot C2 and supporting the top portion 15 for movement above the channel C. The lock assembly 10 is thus capable of movement between the proximal and distal ends of the channel C (and the driveway S) in response to the movement of the leading tire T2.

The locking arm 16 is disposed distally relative to the trigger assembly 15 so that, upon engagement with the assembly 10, the leading tire T2 will be disposed between the locking arm 16 and the trigger assembly 15. The locking arm 16 has a slim, slightly arcuate shaped profile which is adapted to closely conform to the peripheral surface of the leading tire T2. Similarly the profile enables the locking arm 16 to fit between the floating tire T1 and the leading tire T2 without obstruction, as generally shown in the locked restraint in FIG. 1 (position B).

The locking arm 16 has distal and proximal ends 16d, 16p, respectively. The distal end 16d has a roller 16a for engaging the peripheral surface of the tire T2. The proximal end 16p is operatively connected to the trigger assembly 15 by the trolley assembly 17. The locking arm 16 is also pivotally connected to the trolley assembly 17 at its proximal end 16p via pivot 16b for movement between a retracted position generally shown in FIGS. 1A (position A), 2, and 8a, through a plurality of operating positions generally shown in FIG. 8d, and a locked position shown in FIG. 1B (position B) and FIG. 9.

Figure 7:
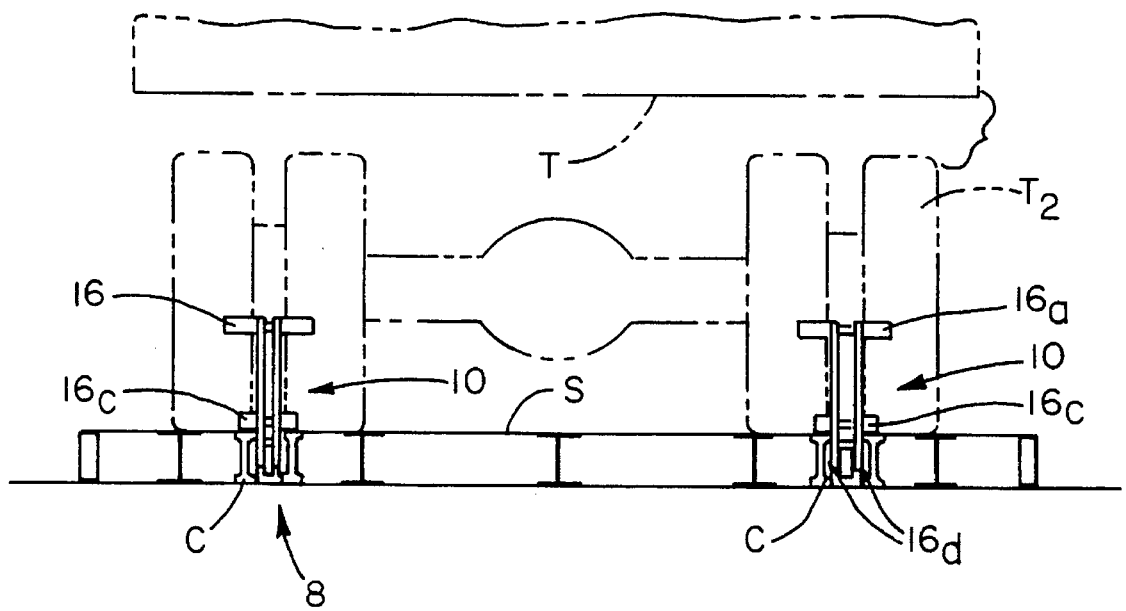
FIG. 7 is a front end schematic view taken along line 7—7 in FIG. 1 showing the lock assembly engaging the vehicle and specifically showing the locking arm in the extended/locking position.

The locking arm 16 also has a roller 16c disposed intermediate the distal and proximal ends 16d, 16p dimensioned to straddle the channel slot C2. In the initial, retracted position best shown in FIG. 2 and 8A, the locking arm 16 is stored subjacent and relatively parallel to the surface of the driveway S in channel C such that the roller 16a is supported by the channel C3 and roller 16c rests on the inclined surface P1 in channel C4. Channel C4 is wider than the slot C2 to accommodate the roller 16c dimensions. Engagement between the leading tire T2 and the trigger assembly 15 and the subsequent rearward movement (to the right in the figures) of the lock assembly 10 in response to the tire T2, causes the locking arm roller 16c to ride up the inclined cam surface P1 (FIG. 8B) until the roller 16a engages the peripheral surface of the tire T1 (shown in FIG. 8B) and the roller 16c rests upon the edges C of the channel C (shown in FIGS. 7 and 8c). The rollers 16c straddle the slot C2, maintaining the locking arm 16 above the channel C as best shown in FIG. 7. When the roller 16c is near the driveway S, above the channel C, the arm's proximal end 16p, disposed in the channel C, acts to maintain the locking arm 16 in a substantially upstanding position relative to the driveway S.

The trolley assembly 17 comprises a biasing link operatively connecting the locking arm 16 and the trigger assembly 15 which facilitates rotation of the locking arm 16 between the retracted position and a plurality of operating positions in response to the linear movement of the trigger assembly 15 and the tire T2. In accordance with certain objects of the invention, the biasing link permits the lock assembly 10 to have a variable length to accommodate different tire sizes, thereby maintaining the locking arm 16 in close contact with the peripheral surface of the tire T2, both during and after activation from the stored position to the operative position.

The biasing link comprises a link 30 pivotally connected to the proximal end 16p at 16b of the locking arm 16 and at least one biasing means 32, such as a spring, operatively connects the link 30 and the trigger assembly 15. The biasing means act to maintain the trigger assembly 15 and the locking arm 16 adjacent to each other. The link 30 is disposed between the wheels of the trigger assembly as shown in FIG. 5.

In the embodiment illustrated in FIGS. 3–4, the link 30 and the springs 32 are disposed within the channel C. The link 30 has at least one roller 30a for slidably moving within the channel C. In the embodiments illustrated in FIGS. 8A–8D and 9, the link 130 is disposed within the channel C whereas the spring 32 is disposed subjacent the channel C. The spring 32 operatively connects the trigger assembly 15 and the link arm 133 rigidly depending from the link 130. The operation of both embodiments is otherwise the same.

Figure 8A:
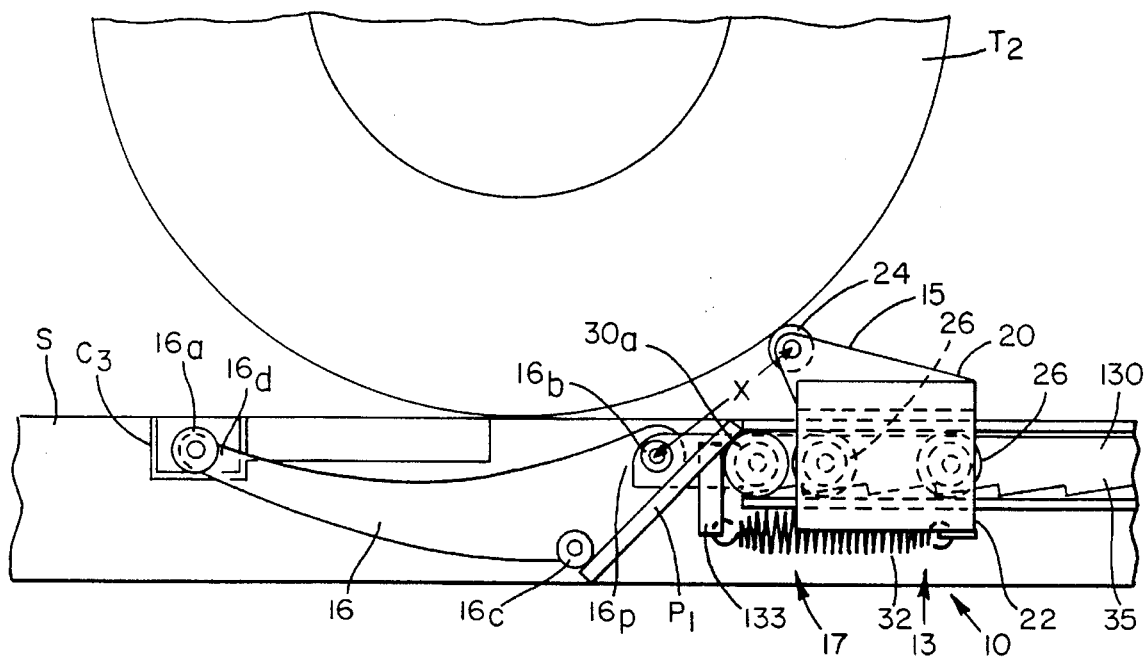
FIGS. 8A–8D illustrate side schematic views of the embodiment of the lock assembly shown in FIGS. 1(A)–(B) moving from the retracted position at initial engagement with the tire to an operating position.

FIGS. 8A–8D illustrate the sequential operation of the lock assembly 10 in response to the leading tire T2. Initially, the lock assembly 10 is positioned at the distal end Sd of the driveway S in its retracted and stored position as shown in FIGS. 2 and 8a. The trigger assembly 15 is disposed above the driveway surface S so that the leading tire T2 of the incoming vehicle T will engage the roller 24 and the locking arm 16 is disposed in the channel C below the driveway surface C, minimizing any interference with the incoming vehicle T. The elevation of roller 24 is kept close to the driveway surface S to minimize the potential for any other part of the vehicle, other than the tire T2, from initially contacting the trigger assembly. Additionally, the close proximity of the roller 24 to the driveway surface S permits the vehicle to drive over the trigger assembly 15 in the event that the lock assembly 10 meets an obstruction to its dockward motion while the vehicle is backing into the docked position. The distance between the pivot point 16b and the engagement point between the trigger assembly 15 and the tire T2 (roller 24) is X.

Figure 6:
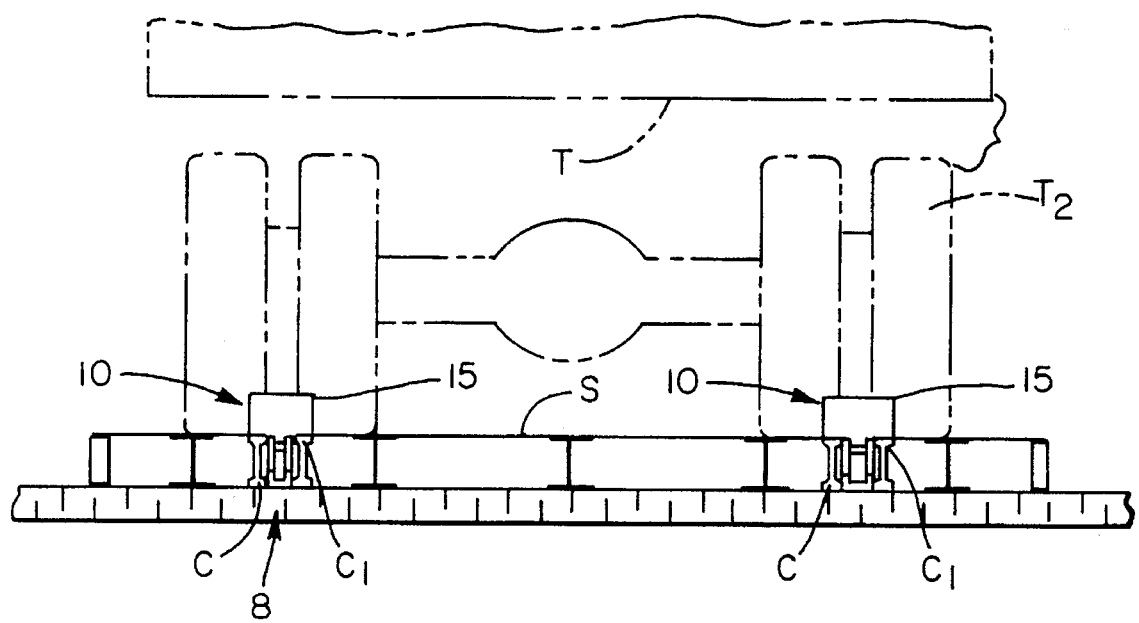
FIG. 6 is a rear schematic view taken along line 6—6 in FIG. 1 showing the lock assembly engaging the vehicle and specifically showing the low profile trigger assembly.

As the leading tire T2 moves toward the loading dock D, it engages the trigger assembly 15 as generally shown in FIG. 6 and drives the lock assembly 10 in the channel C toward the dock D. The trigger roller 24 rolls along the peripheral surface of the tire T2. It will be appreciated that the rollers 26 of the trigger assembly 15 permits movement of the trigger within the channel C.

Figure 8B:
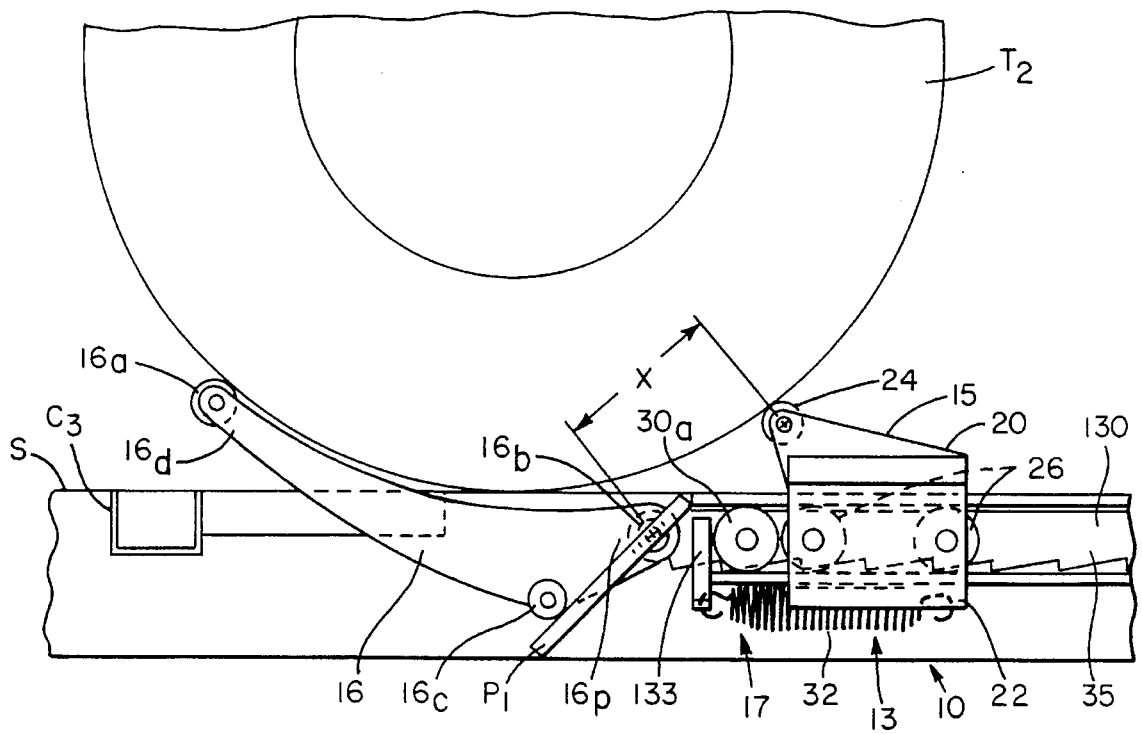

The dockward movement of the trigger assembly 15 causes the locking arm 16 to be positioned from the retracted position to an operating position. The initial movement of the locking arm 16 is defined by the inclined movement of the roller 16c up the inclined surface P1 which acts to position the roller 16a into engagement with the peripheral surface of the tire T2 at a position proximate the driveway S, as best seen in FIG. 8B. It will be appreciated that the proximal end 16p of the locking arm 16 and the roller 24 move in a horizontal direction in response to the movement of the tire T2. The distance X between the pivot point 16b and the roller 24 remains the same.

Figure 8C:
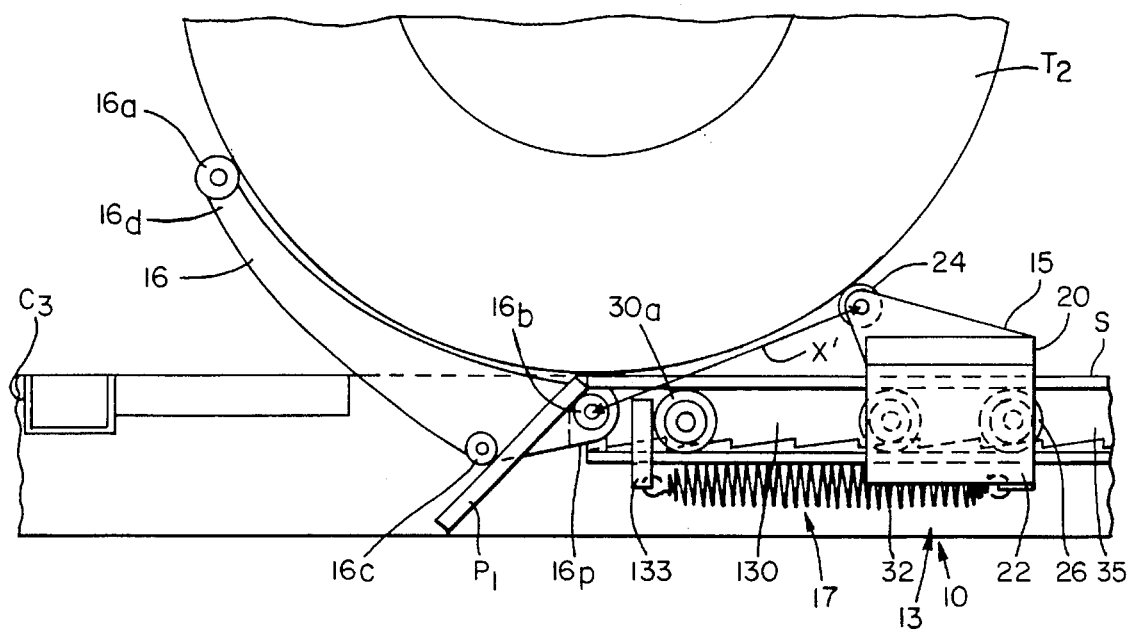
Figure 8D:
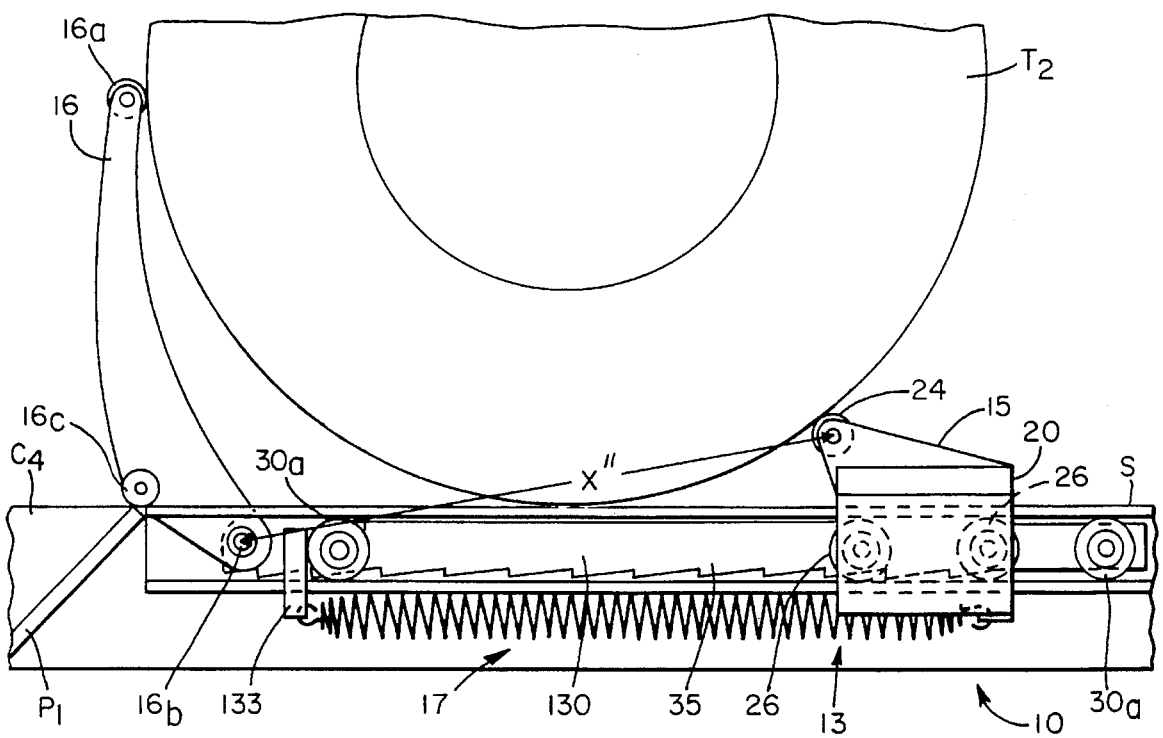

The dockward movement of the tire T2 continues to cause the locking arm roller 16c to roll up the inclined ramp, onto the channel edges C, and above the driveway surface S as shown in FIGS. 8C and 8D. The movement of the locking arm 16 is defined by the simultaneous movement of (1) the trigger roller 24 and the arm roller 16a along the peripheral surface of the tire T2 and (2) the arm roller 16c along the inclined surface P1 and driveway surface S. Since the dimensions of the tire T2 are larger than the distance between the trigger roller 24 and the arm roller 16a, the tire T2 overcomes the biasing force of the springs 32, 132, permitting the roller 16a to rotatably engage the bottom and trailing sides of the tire T2. The distance X between the roller 24 and the pivot point 16b begins to increase as generally referenced by X' in FIG. 8C and X" in FIG. 8D. The movement of the locking arm 16 around the peripheral surface of the tire T2, in a clockwise direction, minimizes or eliminates any interference with the vehicle undercarriage or the adjacent floating wheel T1. The roller 16a continues to roll along the peripheral surface of the tire T2 until the tire is secured between trigger roller 24 and the arm roller 16a and the arm roller 16c is disposed near the driveway surface S.

It should now be appreciated that the variable distance X between the arm roller 16c and the trigger roller 24 permits the lock assembly 10 to accommodate vehicle tires T2 of different sizes while maintaining the locking arm 16 in close contact with the peripheral surface of the tire T2 while traveling between the locking arm stored and operating positions. The variable distance X between the lock arm roller 16c and the trigger roller 24 also permits the effective motion path of the arm roller 16a to vary in response to the size or position of the wheel T2 and traces a path along the peripheral surface of the wheel T2 from an initial contact point adjacent the driveway surface S.

It will be appreciated that the proximal end 16p of the locking arm 16 is secured within the channel C and cannot rise above the driveway surface S due to the connection with the trolley assembly 17 at pivot point 16b. Thus, the locking arm 16 pivots about the roller 16c while the position of this roller is following the cam P1 in clockwise direction towards a generally upstanding position. When the arm roller 16c rests upon the top channel edges C, the locking arm 16 is maintained in the relatively perpendicular and upstanding orientation by the force exerted by the trolley assembly 17 on the proximal end 16p of the locking arm 16 at pivot point 16b. When the arm 16 reaches the position established in FIG. 9, the tire is positively captured between the locking arm 16 and the trigger assembly 15.

Since the trigger assembly 15, the trolley assembly 17 and the locking arm 16 are still free to move in the dockward direction in response to the motion of the tire T2, the lock assembly 10 remains in this operating, but unlocked position, until the vehicle T movement is terminated when the wheel T2 reaches the desired chock position. The vehicle restraint 8 comprises an operator-controlled locking means for positioning the locking arm 16 from an operating position to a locked and chock position which prevents movement of the locking arm 16 toward the distal end Sd of the driveway S. It will now be appreciated that the lock assembly 10 will permit the vehicle T to roll over the low profile trigger assembly 15 without damage to the vehicle or the lock assembly if, for example, the lock assembly 10 should strike some debris or the like while traveling from the initial position to an operating position, whereas, in the chock position, the upstanding locking arm prevents the vehicle from inadvertently moving away from the loading dock.

Figure 9:
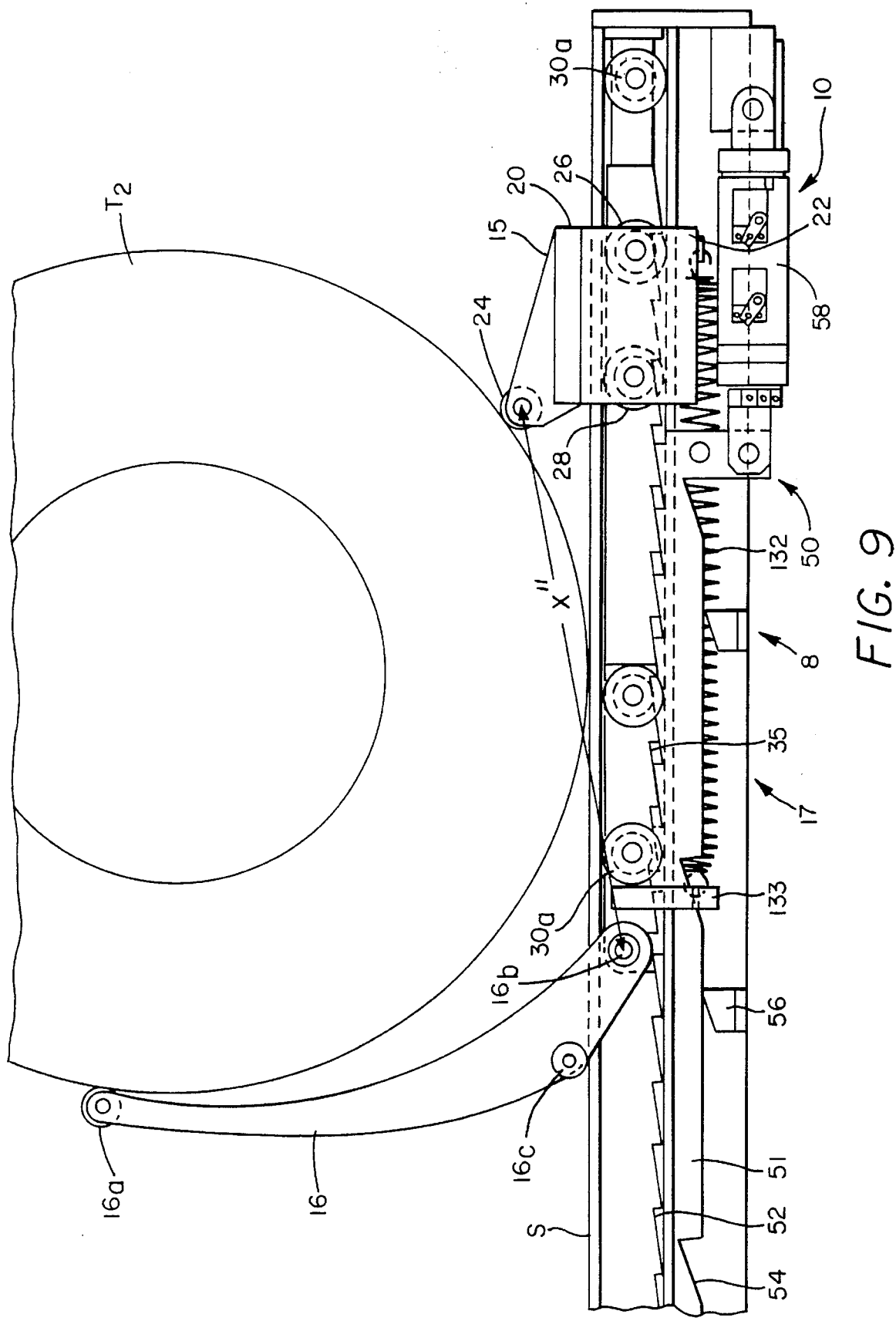
FIG. 9 illustrates the embodiment of the lock assembly in FIGS. 8A–8D in the locked position.

In the illustrated embodiment the locking means comprises a latch assembly 50 comprises a locking bar 51 having a plurality of teeth 52 adapted to lockably engage a plurality of link teeth 35 on the trolley assembly 17. The locking bar 51 is disposed subjacent the channel C to engage the link teeth 35 disposed on the underside of the link 130. The underside of the locking bar 51 has a plurality of inclined surfaces 54 supported by corresponding bars 56. As seen in FIG. 9, movement of the locking bar 51 in response to an actuator 58 connected to the bar 51 causes vertical movement of the locking bar 51 between unlocked and locked positions. In the unlocked position, the locking bar 51 does not engage the link teeth 35 and, in the locked position, the locking bar 51 engages the teeth 35. The engagement of latch teeth 52 with the link teeth 35 is effected by the cylinder 58 drawing locking bar 51 to the right causing upward motion of bar 51 as surfaces 54 ride up on bars 56. Engagement between the latch teeth 52 and link teeth 35 prevent movement of the locking arm 16 and the trolley assembly 17 toward the distal end Sd of the driveway S. The locking arm 16 is positioned in its locked position preventing inadvertent movement of the vehicle T away from the dock D as shown in FIG. 9. It will be appreciated that other locking means will be known to those skilled in the art for providing for positioning the locking arm 16 from the operating position to the locked and chock position which prevents movement of the locking arm 16 toward the distal end Sd of the driveway S.

The lock assembly 10 is thereby positioned in its locked position so that the vehicle T may be safely unloaded with the rearmost wheel T2 being chocked and the vehicle T locked in its loading/unloading position. The lock assembly 10 is maintained in its locked position until such time as the unloading/loading has been completed and when the vehicle T desires to move away from the loading/unloading area.

Once the loading operation is completed, the lock assembly 10 is unlocked so that the vehicle may leave the loading dock D. The operator positions the cylinder 58 so that the teeth 52 of the latching bar 51 and link teeth 35 are disengaged, permitting movement of the locking arm 16, the trolley assembly 17 and the trigger assembly 15 toward the distal end Sd of the driveway S. The upstanding locking arm 16, now in an operating position, moves in the distal direction in response to the leftward movement of the tire T2 and the vehicle T. Similarly, the trolley assembly 17 and the trigger assembly 15 connected to the locking arm 16 also move distally in response to the vehicle T. When the vehicle T is disposed near the distal end Sd of the driveway S, the arm roller 16c engages the inclined ramp P1 and the biasing force of the trolley assembly 17 is released, permitting the locking arm 16 to move downwardly, along the peripheral surface of the tire T2. The weight of the locking arm 16 positions the arm roller 16a and roller 16c into the channels C3 and C4, respectively. In the retracted position, the tire T drives over the lock assembly 10, while the trigger assembly 15 remains in position along driveway surface S, for the next approaching truck.

It should now be appreciated that the entire motion of the lock assembly 10 and specifically the movement of the locking arm 16 to its various operating positions is effected by the movement of the tire T2 only. There is no operating mechanism for moving the lock assembly 10 other than the motion provided by the vehicle T itself.

The vehicle restraint 8 and the linear travelling lock assembly 10 in accordance with the present invention thus provides a substantial improvement over prior art devices. The variable and extensible range of motion between the trigger assembly 15 and the locking arm pivot 16b allows the lock arm roller 16a to engage the lagging edge of the wheel T2 at a relatively low position on the wheel surface and travel along the peripheral surface of the wheel T2 between the stored and operative positions while minimizing the potential for any other part of the vehicle from restricting the lock arm roller 16a motion. The low profile trigger assembly 15 provides a low profile contact point of the roller 24 relative to the driveway S such as to not interfere with any other portion of the vehicle, i.e., ICC bars, tailgates, fenders or mud flaps, insuring that the lock assembly 10 initially contacts the tire T2 as intended and allowing reliable operation of the vehicle restraint 8 over a wide range of vehicle sizes and configurations. The close proximity of the low profile trigger assembly 15 with respect to the driveway S also provides an improvement to the prior art in that if the dockward motion of the lock assembly 10 is restricted by debris and the like, the vehicle T can drive over the trigger assembly 15 without damage to the lock assembly 10 or the vehicle T.

Thus, it will be seen that a vehicle restraint has been provided to attain the aforenoted objects. Various additional modifications of the described embodiments of the invention specifically illustrated and described herein will be apparent to those skilled in this art, particularly in light of the teachings of this invention.

We claim as our invention:

1. A wheel-activated vehicle restraint device for restraining at least one wheel of a vehicle during loading and unloading at a dock position thereof, the vehicle restraint comprising:

a trigger assembly for initially engaging the wheel of the vehicle as said wheel rolls toward the dock position, a chock assembly for chocking the wheel in response to engagement between the wheel and the trigger assembly, and a trolley assembly operatively connecting the trigger assembly and the chock assembly at a connection point such that the connection point is selectively positionable in response to the dimensions of the wheel for insuring that the chock assembly engages a bottom portion of the wheel and moves along the peripheral surface of the wheel to a chock position whereby the vehicle is restrained at the dock position.

2. The device as set forth in claim 1 wherein the trolley assembly comprises a variable length biasing link connecting the chock assembly and the trigger assembly such that the length of the biasing link varies in response to the wheel dimensions and position, thereby positioning the chock assembly to engage the bottom portion of the wheel before moving to the chock position.

3. The device as set forth in claim 1 wherein the trolley assembly comprises a variable length biasing link pivotably connecting the chock assembly at the connection point such that the length of the biasing link varies in response to the wheel dimensions and position, thereby permitting the connection point to be positioned to insure that the chock assembly engages the bottom portion of the wheel before approaching the chock position.

4. The device as set forth in claim 1 wherein the trolley assembly comprises a variable length biasing link connected to the chock assembly at a connection point such that the length of the biasing link varies in response to the wheel so as to vary the effective motion path of the chock assembly.

5. The device as set forth in claim 1 wherein the trigger assembly has a low profile so that the vehicle can drive over the trigger assembly when the chock assembly is restrained from travel with the wheel as the wheel moves toward the dock position.

6. A wheel-actuated chocking device for restraining at least one wheel of a vehicle comprising:

a trigger mechanism for engaging a leading wheel of the vehicle at an engagement point as the vehicle moves towards a dock, a resiliently biased locking arm for chocking the leading wheel of the vehicle, the locking arm being activated in response to engagement between the leading wheel and the trigger mechanism, and a trolley assembly operatively connecting the trigger mechanism and the locking arm and controlling the movement of the locking arm in response to the dimensions and movement of the wheel wherein the locking arm engages a bottom edge of the wheel and moves along the peripheral edge of the wheel to a lagging edge of the wheel.

7. The device as set forth in claim 6 wherein the trolley assembly comprises a connection point connecting the trigger mechanism and a variable length biasing link pivotably connected to the locking arm such that the distance between the connection point and the engagement point varies in response to the dimensions and position of the wheel so that the locking arm is positioned along the peripheral surface of the wheel regardless of the dimensions of the wheel.

8. A wheel-actuated chocking device for restraining at least one wheel of a vehicle comprising:

a lock assembly comprising a trigger mechanism for engaging the leading wheel of the vehicle at a first engagement point as the vehicle moves towards a dock, a resiliently biased locking arm for chocking the leading wheel of the vehicle, the locking arm being activated in response to engagement between the leading wheel and the trigger mechanism, and a trolley assembly connected to the locking arm at a connection point for operatively connecting the trigger mechanism and the locking arm and controlling the position of the connection point relative to the first engagement point in response to the dimensions and movement of the wheel wherein the locking arm engages a bottom edge of the wheel and moves along the peripheral edge of the wheel to a lagging edge of the wheel.

9. The device as set forth in claim 8 comprising a track means extending along a driveway of the dock for receiving and positioning the lock assembly between an initial position and a plurality of operating positions.

10. The device as set forth in claim 9 wherein the track means comprises a channel disposed subjacent the driveway.

11. The device as set forth in claim 10 wherein the channel comprises a cam surface and wherein a portion of the locking arm engages said cam surface to raise the locking arm to the position behind the wheel as the locking arm moves from the initial position to any of the operating positions.

12. The device as set forth in claim 8 comprising two spaced substantially parallel track means disposed on a driveway of the dock for receiving and positioning the lock assembly between an initial position and a plurality of operating positions.

13. The device as set forth in claim 12 wherein the track means comprises a channel disposed subjacent the driveway.

14. The device as set forth in claim 8 comprising a controllable lock capable of selectively locking the locking arm in a chock position behind the wheel.

15. The device as set forth in claim 14 wherein the controllable lock comprises a latch means movable within a track means disposed on a driveway of the dock for receiving and positioning the lock assembly between an initial position and a plurality of operating positions, the latch means movable between an operative and an inoperative position, and the latch means and lock assembly having interacting portions when the latch means is in the operative position to lock the lock assembly in the chock position.

16. The device as set forth in claim 15 wherein the interacting portions are mating teeth.

17. A wheel-actuated chocking device for restraining at least one wheel of a vehicle, comprising:

a trigger mechanism for engaging a leading wheel of the vehicle at an engagement point as the vehicle moves towards a dock, a resiliently biased chock assembly for chocking the leading wheel of the vehicle, and an actuation assembly operatively connected to the chock assembly at a connection point for actuating the chock assembly in response to engagement between the leading wheel and the actuation assembly such that the connection point is selectively positionable in response to the dimensions and movement of the wheel to insure that the chock assembly engages a bottom of the wheel and moves along a peripheral surface of the wheel to a chock position.

18. The device as set forth in claim 17 wherein the actuation assembly comprises a trolley assembly operatively connecting the trigger mechanism and the chock assembly and controlling the movement of the connection point.

19. The claim as set forth in claim 17 wherein the wheel engages the actuation assembly at an engagement point such that the engagement point travels linearly with the wheel for permitting the chock assembly to move along the peripheral surface of the wheel.

20. The claim as set forth in claim 17 wherein the chock assembly is adapted for engaging a selectively actuatable latch mechanism for prohibiting the movement of the chock assembly.

21. A method for restraining a vehicle using a wheel-actuated vehicle restraint having a trigger mechanism engageable by a wheel of the vehicle, a locking arm assembly operatively connected to the trigger mechanism at a connection point and positionable behind the wheel in response to engagement between the trigger mechanism and the wheel, the method comprising:

positioning the trigger mechanism in a driveway, positioning the wheel into engagement with the trigger mechanism at a first engagement point which maintains a constant elevation relative to the driveway, positioning the locking arm assembly into engagement with the wheel at an second engagement point in response to engagement between the wheel and the trigger mechanism, varying the position of the connection point relative to the first engagement point to maintain engagement between both the first and second engagement points and the tire in response to the dimensions and location of the wheel.

* * * * *